May 1, 1923.
A. C. STALEY
REGULATOR FOR SYSTEMS OF APPARATUS
Filed Aug. 14 1919
1,453,291
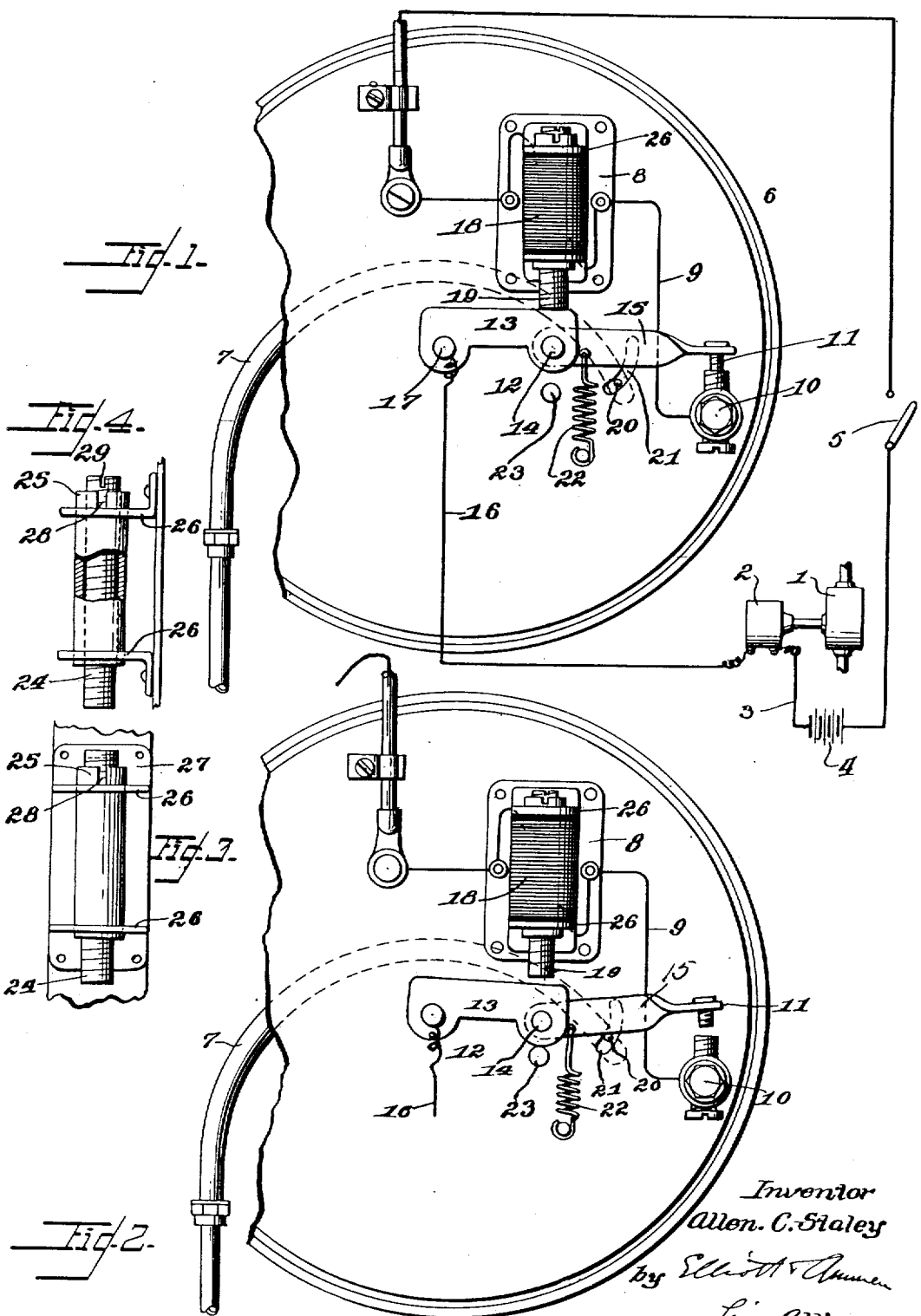
Inventor
Allen. C. Staley
by Elliott & Ammen
his Attys.

Patented May 1, 1923.

1,453,291

UNITED STATES PATENT OFFICE.

ALLEN C. STALEY, OF ST. LOUIS, MISSOURI, ASSIGNOR TO STANDARD ENGINEERING COMPANY, OF ST. LOUIS, MISSOURI.

REGULATOR FOR SYSTEMS OF APPARATUS.

Application filed August 14, 1919. Serial No. 317,496.

*To all whom it may concern:*

Be it known that I, ALLEN C. STALEY, a citizen of the United States, residing in the city of St. Louis and State of Missouri, have invented new and useful Improvements in Regulators for Systems of Apparatus, of which the following is a specification.

This invention relates to the regulation of a system of apparatus, for example, a power plant involving the use of a power developing device such as a boiler. As applied to such a system my invention enables the operation of the boiler to be automatically controlled.

The invention resides particularly in the regulator which I employ and its peculiar relation to the rest of the apparatus in the system. As an example of the use of a regulator, I have described it in the following specification as used in connection with a power plant for an automobile, including a device such as a boiler, the supply of fuel to which is controlled automatically by the pressure existing in the boiler.

Controlling devices or regulators for this general purpose have been employed which operate in such a way that if the boiler pressure drops below a certain point, the fuel pump commences to operate automatically to feed an increased amount of fuel to the boiler. As the boiler usually employed is a flash boiler, the immediate result of an increased fuel supply, or a resumption of fuel feed is to increase the pressure of the steam. The regulators which have been employed for this general purpose are usually controlled by a Bourdon tube which operates in such a way that when the pressure rises above the maximum limit, a circuit is broken and the operation of the pump automatically stops. The mode of operation of these regulators is such that as soon as the pressure drops below the maximum, the circuit immediately closes automatically and the fuel pump starts up. The objection to this mode of operation is that the regulation is too sensitive and involves the too frequent starting and stopping of the pump. This follows by reason of the fact that when the circuit is broken, the contacts which close the circuits are not moved very far apart and when the pressure drops, even a slight amount, the contacts touch again and close the circuit.

The general object of the present invention is to provide means for regulating a system of apparatus, so that it will operate in such a way as to permit a considerable range in the controlled device, for example, considerable range between the maximum and minimum pressures of the boiler, thereby avoiding the frequent starting and stopping of the fuel pump. It should be understood, however, that I do not in any way limit the application of my invention to the particular kind of system of apparatus referred to above, and in its broad aspect the invention must be regarded as regulating means for effecting the automatic regulation of a device performing any function related to a system of apparatus in such a way as to permit of a relatively wide range in the functioning limits or conditions of the regulated device.

According to my invention, I employ a controlling member which has an automatic movement corresponding in extent to the functioning range of the controlled device. Now, when this controlling member arrives at a position corresponding to the maximum functioning limit of the controlled device, it actuates controlling means in such a way as to reduce the activity of the controlled device. Of course, as soon as this occurs, the controlling member commences a return movement. With ordinary apparatus, almost immediately that the return movement begins, the controlling means will be affected in such a way as to start up the controlled device again, but with my invention I provide for delaying the starting up of the controlled device until the controlling member has arrived at a position corresponding to the minimum functioning limit of the device. In order to do this, I prefer to provide means for affecting the controlling means after the controlled device has been stopped or reduced in its activity, the effect of which is, that even when the controlling member, in its return movement arrives in the same position at which it caused the reduction of the activity of the controlled device, it will not start up the controlled device at this point, but only after it has had a further return movement.

One of the specific objects of my invention is to provide a regulator involving the use of two relatively movable contacts, the separation of which by a controlling member will break an operating circuit and I operate the contacts in such a way that as soon as the circuit is broken by separating the contacts, the distance between the separated contacts is automatically increased, and the contacts are operated thereafter so that they will not come together again until a very considerable movement has taken place in the controlling member. In other words, in the return movement of the controlling member, its arrival at the position in which it separated the contacts will not operate to permit the contacts to come together; the controlling member does not permit this until it has arrived at a position corresponding to the lower functioning limit of the controlled device, for example, the minimum boiler pressure.

Further objects of the invention will appear hereinafter.

The invention consists in the novel features, and in the general combination of parts to be particularly described hereinafter, all of which contribute to produce a simple and efficient regulator. A preferred embodiment of my invention will be particularly described in the following specification, while the broad scope of my invention will be pointed out in the appended claims.

In the drawing,

Figure 1 is a front elevation showing a regulator embodying my invention and diagrammatically illustrating its relation to a system of apparatus such as a steam power plant. This view shows the regulator with the contacts in their engaging position at which time they close the operating position at which time they close the operating circuit;

Figure 2 is a view similar to Figure 1, but omitting the diagram of the apparatus, and simply showing the regulator with the contacts in their separated relation;

Figure 3 is a front elevation showing details of the core of an electro-magnet which I may employ; and Figure 4 is a side elevation of the magnet-core shown in Figure 3 and broken away so as to further illustrate details of the construction.

My invention may be applied to effect the regulation or control of any form of power plant or apparatus in which a device or devices in the system are to be automatically regulated to operate or function within certain predetermined limits.

I shall now describe the regulator as applied to a steam power plant such as carried by a steam driven automobile.

Referring especially to Figure 1, 1 indicates diagrammatically, a pump which supplies fuel when necessary to a flash boiler, not illustrated, said pump being driven when required by an electric motor 2. This motor is connected in an electric circuit 3 with a suitable battery 4 or source of E. M. F. and the circuit may include a switch 5 which may be closed at will. The system of apparatus may include a device such as a boiler, the pressure of which is to be regulated between predetermined limits. In order to accomplish this I provide the electric circuit closing mechanism actuated by two forces, one of the forces being dependent upon the other, and the other force, that is to say, the second force is controlled by conditions in the device such as the boiler, so that it functions automatically in conjunction with the first force during the operation of the apparatus to break the circuit at a given pressure in the device or boiler and to close the circuit at a different pressure. In the present embodiment of the invention, in the circuit 3 of my regulator 6 is connected, and co-operating with the regulator there is a controlling member controlled by an external force, for example, the steam in a freely movable Bourdon tube 7 which is supposed to be connected with the flash boiler, not illustrated, the steam boiler representing a controlled device in the system of apparatus, the operation of which is directly affected by the pump 2, another device in the system, the pump 2 being controlled by the electric current flowing in the circuit 3. The regulator is controlled in its operation by means such as a controlling member in the form of a Bourdon tube having a movement corresponding to the functioning limits of the controlled device, and I prefer to provide an electrically actuated force such as an electro-magnet to co-operate with the controlling member.

I shall now describe the controlling means that is actuated or controlled by the controlling member.

The regulator 6 may include an electro-magnet 8 which is connected in the circuit 3 and a suitable conductor 9 in this circuit connects with two relatively movable contacts. The organization of the relatively movable contacts is such that the controlling member, such as the Bourdon tube 7 is capable of separating the contacts in its position corresponding to the maximum working pressure. This will break the operating circuit. I provide means operating immediately after the circuit is broken to change the relation of the controlling means to the controlling member and thereby delay the closing of the circuit. This means acts independently of the moving part or Bourdon tube, that is, it is unattached to the Bourdon tube. Hence it does not restrict in any way the free movement of the tube. I accomplish this by effecting a further separation of the contacts from each other. Hence the return of the moving part of the tube 7 to the position in which it effected the separation of the contacts will not bring about a re-engagement of the contacts. The Bourdon tube is capable of assuming a first position corresponding to the minimum pressure limit of the boiler and a second position corresponding to the maximum pressure limit.

In order to accomplish this result, I prefer to provide a fixed contact 10 to which the conductor 9 is attached, and I also provide a movable contact 11 which is carried by a movable contact member or arm 12. This movable contact member 12 may comprise an inner part or inner section 13 which is pivoted at one end and connected by a joint such as a pivot joint 14 at its outer end with an outer-section or contact-carrier 15 which carries the movable contact 11. A conductor 16 of the circuit 3 is connected with the pivot pin 17 which pivotally supports the movable contact member 12. This circuit and the magnet with its associated parts operate as controlling means for the controlled device.

It is evident the circuit closing mechanism such as the movable contact member or jointed arm 12 is actuated by one force exerted by the magnet 18, and a second force, for example the Bourdon tube, and while the Bourdon tube is independent of the magnet in the sense that the magnet in no way hinders the free movement of the Bourdon tube, nevertheless the magnet, is dependent upon the Bourdon tube, because it ceases to be energized by the current when the contacts are separated by the movement of the tube. In other words, the Bourdon tube and the magnet represent two forces to control, the closing of the circuit, the first force or magnet being dependent for its operation upon the latter force or Bourdon tube.

Figure 1 illustrates the apparatus at a time when the motor 2 is supposed to be actively operating, that is to say, the contacts 10 and 11 are in engagement with each other, and hence the coil 18 of the electromagnet is energized. The flow of the current, of course, excites the core 19 of the electro-magnet so that the electro-magnet attracts the movable contact member 12. The function of this magnet is to release the movable contact arm 12 when the circuit is broken. In the specific construction described, the magnet is disposed near the joint 14 and when it holds the joint of the movable contact member 12 elevated, the movable contact 11 would rest by gravity on the fixed contact 10. The end or moving part of the controlling member or Bourdon tube 7 is provided with engaging means 20 which, when steam pressure rises toward the maximum point moves along in the slot 21, and engages the lower edge of the movable contact member 12 and thereby raises the movable contact 11; this breaks the circuit. I prefer to locate the engaging means 20 between the joint 14 and the fixed contact 10.

Suppose, now, that the engaging member 20 which may consist simply of a pin, strikes the underside of the contact carrier 15; when this occurs, it will swing the outer end of the contact carrier 15 upwardly and separate the contacts 10 and 11; this will de-energize the electro-magnet 8 which will permit the movable contact member to fall, that is to say, the joint 14 "breaks" by gravity by a downward movement, during which movement the weight of the movable contact member co-operates with the Bourdon tube to effect a further separation of the contacts, that is to say, engaging means 20 operates as a fulcrum, on which the contact-carrier 15 moves or rocks, the result of which is that after the Bourdon tube has separated the contacts, the separating movement is augmented, that is to say, the distance between them will immediately become greatly increased, and the return movement of the moving end of the Bourdon tube will not immediately effect a re-engagement of the contacts, but this re-engagement will be delayed. In other words, the releasing of the movable contact arm gives the movable contact 11 a differential movement depending on the relation of the fulcrum 20.

In order to insure firm engagement of the contacts and to quicken the action of the movable contact, I prefer to provide means such as a spring 22 which is attached to the contact-carrier 15 between the joint and the movable contact 11. This spring, of course, assists in pulling the movable contact further from the fixed contact as soon as the circuit is broken. The downward movement of the joint 14 is limited by a stop in the form of a pin 23, see Figure 2.

With this organization of parts, it is evident that a device or machine in a system of apparatus can be regulated in such a way as to permit a considerable range in the functioning limits of the device, for example, in the application of the invention described above, the regulator permits the regulation of the boiler through a wide range of pressure, permitting a minimum limit of five hundred pounds per square inch, and a maximum limit of six hundred pounds per square inch.

It may be desirable to provide for effecting a nice adjustment of the core 19 of the electro-magnet. If such an adjustment is desired, I prefer to construct the electro-magnet in the manner illustrated in Figures 3 and 4, that is to say, the core is provided with threads 24 so that it constitutes a screw which is threaded into a tubular casing 25, about which casing the coil 18 is wrapped. The casing 25 is supported at its ends in suitable angle brackets 26 attached to a base-plate 27. The upper end of the tube 25 is provided with slots 28, and the upper end of the core 19 is provided with a screw slot 29 which enables the core to be adjusted by means of a screw driver. After the core 19 has been adjusted to the desired point, the upper end of the tube 25 at the slots 28 is crimped inwardly so as to engage the threads 24 and thereby hold the core in the adjusted position.

In the mode of operation of the apparatus and regulator, it should be understood that the controlling member, such as the Bourdon tube 7, has a movement corresponding to the functioning range of the controlled device, such as the boiler. When the moving part of the Bourdon tube arrives at the position corresponding to the maximum limit of the boiler pressure, it will activate the controlling means including the contacts 10 and 11, and thereby stop the action of the pump 2; this inhibits or reduces the activity of the boiler, that is to say, it will cause the boiler to generate less steam. As soon as this occurs the pressure in the boiler immediately drops and the Bourdon tube begins a return movement. Immediately after the contacts are separated and the circuit is broken by the Bourdon tube, the movable contact operates automatically to effect a further separation between the contacts, so that in the return movement of the Bourdon tube the contacts will not re-engage when the Bourdon tube assumes the same position which it assumed when it broke the circuit. In other words, the reengagement of the contacts is greatly delayed by means of the new relation of the movable contact. In the present instance, this is due to the fact that the Bourdon tube operates as a fulcrum for supporting the movable contact in an elevated position and greatly removed from the fixed contact. However, after the pressure drops to the minimum limit the Bourdon tube permits the contacts to come together again, whereupon the circuit becomes closed, the magnet attracts the movable contact member again and the operation of the pump 2 is resumed.

It is understood that the embodiment of the invention described herein, is only one of the many embodiments my invention may take, and I do not wish to be limited in the practice of my invention, nor in my claims, to the particular embodiment set forth.

What I claim and desire to secure by Letters Patent is:

1. In a regulator for controlling a device operating in a system of apparatus, the combination of an electric circuit, a pair of contacts, one of which is movable relatively to the other and operating when in engagement to close the circuit, a member controlled by said device for engaging the movable contact to move the same away from the other contact and thereby open the circuit, and means co-operating with said member after the circuit is broken to increase the distance between the contacts.

2. In a regulator for controlling a device operating in a system of apparatus, the combination of an electric circuit, a pair of contacts, one of which is movable relatively to the other and operating when in engagement to close the circuit, a member controlled by said device for engaging the movable contact to move the same away from the other contact and thereby open the circuit, and means co-operating with said member, but actuated independently of said member after the circuit is broken, to change the relation of the movable contact with respect to the other contact and operating to delay the re-engagement of the contacts in a receding movement of said member.

3. In a regulator for controlling a device operating between predetermined functioning limits in a system of apparatus, the combination of a member controlled by said device and including a freely moving part having a movement corresponding to the said functioning limits, controlling means actuated by said moving part when it arrives at a position corresponding to one of said limits, means operating thereafter independently of said moving part to change the relation of said controlling means with respect to said moving part, said moving part operating to activate said controlling means when the moving part arrives at a position corresponding to the other of said limits.

4. In a regulator for controlling pressure apparatus operating between predetermined limits of pressure the combination of a freely moving part moving to correspond with the changes of pressure, controlling means co-operating with said moving part when it arrives at a given point corresponding to the high limit pressure to effect a reduction in the generation of pressure, means actuated by the moving part, and independent of any pressure in the apparatus, operating independently of said moving part after said moving part arrives at said given point, and independently of said moving part, to change the relation of said controlling means with respect to said moving part, whereby said moving part will actuate the said controlling means only after the moving part has passed beyond said given point in its return movement.

5. In a regulator for controlling pressure apparatus operating between predetermined limits of pressure, the combination of a freely moving part operating to assume a first position corresponding to the minimum pressure and capable of assuming a second position corresponding to the maximum pressure limit, controlling means for controlling the generation of pressure in the apparatus, rendered active by said moving part when the moving part assumes the second named position said controlling means being independent of any pressure in the apparatus, and means for affecting said controlling means, operating after the same has been rendered active to prevent the actuation of the controlling means by said moving part until it reaches its first named position.

6. In a regulator for controlling a device operating in a system of apparatus, the combination of an electric circuit, a pair of contacts one of which is movable relatively to the other and operating when in engagement, to close the circuit, a member controlled by said device having engaging means for engaging the movable contact to move the same away from the other contact and thereby open the circuit, and means co-operating with said member to rock the movable contact on said engaging means and thereby increase the distance between said contacts.

7. In a regulator for controlling a device operating in a system of apparatus, the combination of an electric circuit, a pair of contacts, one of which is movable, and the other fixed, a movable contact arm carrying the movable contact, a member controlled by said device for engaging said movable contact arm to move the same away from the fixed contact and thereby open the circuit, and means controlled by the breaking of the circuit for changing the relation of the movable contact arm with respect to the other contact and operating to increase the distance between the contacts.

8. In a regulator for controlling a device operating in a system of apparatus, the combination of an electric circuit, a pair of contacts, one of which is movable and the other fixed, a movable contact arm having a joint therein and carrying the movable contact, a member controlled by said device for engaging said movable contact arm to move the same away from the fixed contact and thereby separate the contacts and open the circuit, an electro-magnet in said circuit operating to attract the movable contact arm when the circuit is closed and permitting the same to fall and break the joint therein, when the circuit is broken to rock the said member as a fulcrum and increase the distance between the contacts.

9. In a regulator for controlling a device operating in a system of apparatus, the combination of an electric circuit, a pair of contacts, one of which is movable and the other fixed, a movable contact arm having a joint therein and having an outer section carrying the movable contact, a member controlled by said device for engaging said movable contact arm to move the same away from the fixed contact and thereby separate the contacts and open the circuit, an electro-magnet in said circuit operating to attract the movable contact arm when the circuit is closed and permitting the same to fall and break the joint therein, when the circuit is broken, said movable contact arm operating when the joint is broken to rock its outer section on the said member as a fulcrum and increase the distance between the contacts.

10. A regulator constructed as specified in claim 7 in combination with a spring for accelerating the action of the movable contact arm in increasing the distance between the contacts.

11. A circuit controlling device having a movable controlling member actuated to advance or recede by increase or decrease in power of a force to be controlled, means including an electric circuit, controlling the action of said force, co-acting contact members included in said circuit and one of which is movable into and out of contact with the other by said movable member to break said circuit, for controlling said force, and an electrically controlled force co-operating with said controlling member for controlling the movable contact to augment the separating movement of the movable contact by said controlling member.

12. A circuit controlling device having a movable controlling member actuated to advance or recede by increase or decrease in power of a force to be controlled, means including an electric circuit, controlling the action of said force, co-acting contact members included in said circuit and one of which is movable into and out of contact with the other by said movable member to break said circuit, for controlling said force, and means independent of any pressure in the apparatus operating automatically after the circuit is broken to augment the separating movement of the contact which is moved by said controlling member.

13. In combination with a controlled device operating in a system of apparatus, an electric circuit for controlling the device, circuit closing mechanism for said circuit actuated by two forces, one of which, generated in the operation of the system, operates to actuate said mechanism to break the circuit at a predetermined point, means for applying said force to said mechanism, means independent of the operation of the system for generating the second force, and means for applying the second force to said mechanism, said second force being controlled in its action upon said mechanism by the first force, and the latter force being rendered active in relation to said mechanism by predetermined conditions in the system and operating, in conjunction with said second force, in the operation of the device, to effect the closing of the circuit at a point different from that at which the circuit is broken.

14. In combination with a controlled device operating in a system of apparatus, an electric circuit for controlling the device, circuit-closing mechanism, a plurality of means for controlling the action of the circuit-closing mechanism, one of said means being independent in operation, but rendered active by the other, and the latter means being constructed to be controlled by the device according to conditions in the latter, said means co-operating in the operation of the device to automatically break the circuit at a predetermined operating pressure in said device and to close it at a different pressure.

In testimony whereof, I have hereunto set my hand.

ALLEN C. STALEY.